United States Patent Office 2,750,280
Patented June 12, 1956

2,750,280
PROCESS FOR RAPIDLY DESULFURIZING STEEL

René Perrin and Jean Lamberton, Paris, France, assignors to Societe d'Electro-Chimie d'Electro-Metallurgie et des Acieries Electriques d'Ugine, Paris, France, a corporation of France No Drawing. Application January 15, 1952,
Serial No. 266,596

Claims priority, application France February 1, 1951

6 Claims. (Cl. 75—55)

This invention relates to a process for rapidly desulphurizing steel.

Desulphurization of steel in an electric furnace by means of slags having high lime contents is a common practice.

Processes for rapidly desulphurizing steel also are disclosed in Perrin Patents 2,232,403 and 2,288,836. According to those patents, a silicon reducing agent is added to the steel bath in the furnace, and then the steel is poured into a ladle and during the pouring, is violently intermixed with a slag which reduces the sulphur content of the steel. The slags used according to these patents are basic in character containing, for example:

| | Percent |
|---|---|
| Lime | 60 |
| Silica | 16 |
| Alumina | 19 | or

| | Percent |
|---|---|
| Lime | 47 |
| Silica | 7 |
| Alumina | 43 |

Small amounts of suitable fluxes, fluorspar in particular, are added to the above listed slags in order to increase their fluidity, which is necessary to obtain efficient intermixing of the steel and slag. The processes of the above mentioned Perrin patents permit lowering the sulphur content of the steel from about 0.030% to 0.010% and even less, by using slag in an amount of about 5% based on the weight of the steel to be treated. This relatively high proportion of slag to steel to be treated requires, generally, the use of melted slags, and this necessitates the existence in the steel making shop of a furnace specifically adapted to slag melting.

According to the present invention, a slag has been developed which can be premelted, solidified and pulverized, or sintered and pulverized, and used in the form of solid particles by adding it to the steel while it is being poured into a ladle. This obviates the necessity of providing a slag melting furnace in the steel making shop.

In order that solid pulverized slag be effective practically instantaneously for desulphurizing steel when the slag is added to the steel while the latter is being poured into a ladle, the slag must have a low melting point and a very high desulphurizing power. If the melting point of the slag is too high or if its desulphurizing power is too low, all of it will not melt and be effective when added in a solid state during the pouring of the steel into a ladle.

In an attempt to produce slags having low melting points and high desulphurizing power, applicants added up to 30% of fluorspar to lime slags, but it was found that such contents of fluorspar gave results which were only partially satisfactory, the melting point being too high with the result that the slag did not melt to a sufficient extent in the desulphurizing process. Applicants found however that, contrary to their expectations, a slag having the desired properties of low melting point and high desulphuring power could be obtained by employing a very high content of fluorspar and a relatively low content of lime, as for example 80% by weight of fluorspar and 20% by weight of lime. The percentages of the ingredients of the slag according to our invention can vary between 60–85% fluorspar and 15–40% free lime, it being preferred to have the slag contain from 70 to 85% fluorspar and 15 to 30% lime.

While it is preferred that the slag consist essentially of fluorspar and lime in the proportions previously mentioned, it can contain other fluxing agents of suitable character. The slag, in order to be suitable in our process, must have a relatively low melting point and must contain a sufficiently large proportion of free lime to be effective in desulphurizing the steel. If the lime exceeds about 40% of the weight of the slag, the slag does not have a sufficiently low melting point. On the other hand, lime in amount less than about 15% does not provide a sufficient quantity of lime to effectively desulphurize the steel. In our preferred compositions consisting essentially of fluorspar and lime, almost all of the lime is present in the free state. If fluxing agents are to be added to such compositions, they must either be in such small amount or of such character that they will not combine with the free lime to a prohibitive extent which would lower the content of free lime and leave not enough of it available for combining with the sulphur of the steel. Therefore, if fluxing additions are made, we prefer that such fluxes be of a basic rather an acidic character. Silica or other fluxes of an acidic character will combine with the lime and render it ineffective. Accordingly, in our slag, silica or other acidic constituents capable of combining with free lime should not exceed about 10% by weight of the slag. Fluxes which can be used in our slag are oxides or salts of the alkali metals, alkaline earth metals, or magnesium. We can also use alumina, either in its uncombined state or in combination, as for example calcium aluminate. Preferably the alkali metal, alkaline earth metal or magnesium compounds are used in the form of fluorides.

The slag is prepared in solid, pulverized form in advance of its use in the desulphurizing process. It can be prepared by melting lime and fluorspar in the proportions previously indicated (and other slag constituents when desired), the melt being then allowed to cool and then crushed to appropriate grain size. Instead of melting the lime and fluorspar (and other slag constituents when desired), the raw materials can be combined by sintering in a kiln or other suitable equipment.

The desulphurizing process may be carried out in the following manner. The steel to be desulphurized is melted in an electric or other furnace, and while it is in the furnace, a reducing agent such as silicon or aluminum is added to it, the preferred amount of such reducing agent being between 0.2% and 1.0%, based on the weight of the steel bath. The reducing agent can also be introduced into the pouring ladle just before or during the pouring. The furnace slag is very carefully slagged off from the steel or a device for preventing slag from flowing with the steel is employed, and the steel is then poured into a ladle. While the steel is being poured into the ladle, the desulphurizing slag in the form of solid particles is added to the stream and is thereby automatically violently intermixed with the steel. A portion of the solid particles of slag may also be added to the ladle before the pouring of the steel begins. Pouring should be performed in big streams or from sufficient height so as to obtain an intimate and violent intermixing of the slag and steel. As soon as pouring is completed and intermixing has ceased (the latter practically coinciding with the end of pouring), the slag rises to the surface of the steel bath. Thus the reaction is practically instantaneous.

At that time or just before that time, a sufficient amount of lime or other basic material is added on top of the slag in the ladle to "dry" the slag. The lime dissolves very rapidly in the floating slag and thus lessens considerably its corrosive action on the refractories of the ladle. Experience has shown that the corrosive action, which is relatively small during intermixing, especially when such intermixing is rapid, becomes very strong from the moment when, once intermixing is completed, a layer of slag has formed upon the bath. If care is not taken to add lime at that time, the corrosive action of the slag begins very quickly, and continues throughout the time that the steel is being cast. The addition of lime at the right moment allows practical suppression of this corroding action and renders possible the use of slags containing high proportions of calcium fluoride in the usual steel works ladle. The addition of lime, of course, would be useless if the ladle refractories used were particularly resistant to the slag, but no such refractories are known to exist, the cost of which would be practical for steel melting operations.

The amount of lime to be added at the end of the desulphurizing operation depends, of course, upon the amount of slag used. It may be, for instance, two to four times the weight of the slag. Preferably the lime is added in the form of medium sized lumps, or in the form of grains. It is possible to replace lime partially or totally by other basic refractory materials which produce the same or a similar "drying" effect on the slag as does lime. For example, dolomite has been found to give good results.

As above pointed out, the previously prepared slag in the form of solid particles is added to the steel during the pouring of the latter into a ladle. The grain size of the slag should not be so large that it does not melt during the desulphurizing treatment, nor should it be so small that it is blown out during the pouring of the steel. It has been found that a mixture of grains having a maximum diameter less than 2 mm. and containing less than 20% by weight of particles below 0.1 mm., is most satisfactory.

The amount of slag to be used varies according to the initial sulphur content of the steel and the desired final content. As an indication, a proportion by weight of 2 to 3% of slag based on the weight of the steel has been found to reduce the sulphur content from 0.030% to 0.010%.

The following examples illustrate our process:

*Example I*

A slag was prepared by melting 75% of fluorspar and 25% of lime, solidifying and crushing the slag into fine grains.

One ton of extra mild steel was melted in an electric furnace and 0.4% of silicon, in the form of ferro-silicon containing 75% silicon, was added to the molten bath. After a very careful slagging off, the furnace was tilted and the steel was poured into a ladle while 25 kgs. of the solid crushed slag were thrown into the pouring stream. The level of the ladle was 1.5 m. below the pouring channel of the furnace, which resulted in a good intermixing of the steel and slag. The slag melted almost immediately and was dispersed into the steel.

Just before pouring was completed, 50 kgs. of lime in grain form were thrown on top of the rising steel and slag in the ladle. The slag was allowed to rise for a time and then the steel was cast into ingot molds. An examination of the ladle after casting showed no abnormal attack on the refractory lining.

The sulphur content of the steel was reduced from 0.030% in the bath in the furnace to 0.010% as measured in the cast ingots.

*Example II*

By carrying out the process in the same manner as described in connection with Example I, the sulphur has been reduced from 0.045% to 0.021%.

Our desulphurizing process functions practically instantaneously in that the reaction is complete immediately following the completion of the pouring. The pouring may be so rapid that 25 tons of steel are poured and treated with the desulphurizing slag in less than 1½ minutes. In order to accomplish this extremely rapid desulphurization of large quantities of steel, the melting point of the desulphurizing slag must be very low and its desulphurizing power must be very high. This is accomplished by using the slag ingredients in the proportions above mentioned and reacting them prior to use either by melting or sintering so that the solid particles will melt substantially completely when added to the pouring stream of steel. Mere mixtures of the solid components of the desulphurizing slag, not previously reacted, will not function nearly so effectively or rapidly.

The invention is not limited to the preferred embodiment but may be otherwise embodied or practiced within the scope of the following claims.

We claim:

1. A process for desulphurizing steel practically instantaneously, which comprises adding to a steel bath a reducing agent of the group consisting of silicon and aluminum, pouring a stream of the molten steel into a ladle and adding particles of slag in a solid state to the stream during the pouring operation, said slag containing as principal constituents a previously reacted mixture of fluorspar and lime in the proportions by weight of 60–85% fluorspar and 15–40% lime, said slag containing not over 10% by weight of acidic constituents capable of combining with the lime in the slag, said particles of slag melting substantially completely when added to the pouring stream of steel.

2. A process for desulphurizing steel practically instantaneously, which comprises adding to a steel bath a reducing agent of the group consisting of silicon and aluminum, pouring a stream of the molten steel into a ladle and adding particles of slag in a solid state to the stream during the pouring operation, said slag containing as principal constituents a previously reacted mixture of fluorspar and lime in the proportions by weight of 70–85% fluorspar and 15–30% lime, said slag containing not over 10% by weight of acidic constituents capable of combining with the lime in the slag, said particles of slag melting substantially completely when added to the pouring stream of steel.

3. A process for desulphurizing steel practically instantaneously, which comprises adding to a steel bath a reducing agent of the group consisting of silicon and aluminum in an amount of 0.2–1.0% based on the weight of the steel bath, pouring a stream of the molten steel into a ladle and adding particles of slag in a solid state to the stream during the pouring operation, said slag containing as principal constituents a previously reacted mixture of fluorspar and lime in the proportions by weight of 60–85% fluorspar and 15–40% lime, said slag containing not over 10% by weight of acidic constituents capable of combining with the lime in the slag, said particles of slag melting substantially completely when added to the pouring stream of steel.

4. A process for desulphurizing steel practically instantaneously, which comprises adding to a steel bath a reducing agent of the group consisting of silicon and aluminum, pouring a stream of the molten steel into a ladle and adding particles of slag in a solid state to the stream during the pouring operation, said slag containing essentially of a previously reacted mixture of 60–85% fluorspar and 15–40% lime, said particles of slag melting substantially completely when added to the pouring stream of steel.

5. A process for desulphurizing steel practically instantaneously, which comprises adding to a steel bath a reducing agent of the group consisting of silicon and aluminum, pouring a stream of the molten steel into a ladle and adding particles of slag in a solid state to the stream during the pouring operation, said slag containing essentially of a previously reacted mixture of about 80% fluorspar and about 20% lime, said particles of slag melting substantially completely when added to the pouring stream of steel.

6. A process for desulphurizing steel practically intaneously, which comprises adding to a steel bath a reducing agent of the group consisting of silicon and aluminum, pouring a stream of the molten steel into a ladle and adding particles of slag in a solid state to the stream during the pouring operation, said slag containing as principal constituents a previously reacted mixture of fluorspar and lime in the propotrions by weight of 60-85% fluorspar and 15-40% lime, said slag containing not over 10% by weight of acidic constituents capable of combining with the lime in the slag, said particles of slag melting substantially completely when added to the pouring stream of steel, and within a short time of completion of pouring, adding a basic material to the slag in the ladle to inhibit corrosive attack on the ladle lining.

References Cited in the file of this patent

UNITED STATES PATENTS

| | | |
|---|---|---|
| Re. 23,778 | Bowden | Feb. 9, 1954 |
| 581,942 | Saniter | May 4, 1897 |
| 1,549,313 | Jackson et al. | Aug. 11, 1925 |
| 1,920,465 | Harris | Aug. 1, 1933 |
| 2,184,078 | Hyde | Dec. 19, 1939 |
| 2,243,514 | Tigerschiold | May 27, 1941 |
| 2,288,836 | Perrin | July 7, 1942 |
| 2,406,582 | Bieber et al. | Aug. 27, 1946 |
| 2,620,267 | Kern | Dec. 2, 1952 |

FOREIGN PATENTS

| | | |
|---|---|---|
| 201,555 | Great Britain | Oct. 24, 1924 |

OTHER REFERENCES

Nagai et al.: J. Soc. Chem. Ind., Japan, 1934, vol. 37, pp. 303–306B, 419–421B. "Studies on the Effects of Fluorides Upon Thermal Synthesis of Calcium Silicates I and II."